US010470031B2

(12) United States Patent
Xu

(10) Patent No.: US 10,470,031 B2
(45) Date of Patent: Nov. 5, 2019

(54) VOICE OVER IMS ROAMING GATEWAY

(71) Applicant: iBasis, Inc., Lexington, MA (US)

(72) Inventor: Richard H. Xu, Wakefield, MA (US)

(73) Assignee: iBasis, Inc., Lexington, MA (US)

( * ) Notice: Subject to any disclaimer, the term of this patent is extended or adjusted under 35 U.S.C. 154(b) by 0 days.

(21) Appl. No.: 15/598,460

(22) Filed: May 18, 2017

(65) Prior Publication Data
US 2017/0339552 A1 Nov. 23, 2017

Related U.S. Application Data

(60) Provisional application No. 62/339,352, filed on May 20, 2016.

(51) Int. Cl.
*H04W 4/00* (2018.01)
*H04W 8/08* (2009.01)
*H04L 5/00* (2006.01)
*G06F 16/435* (2019.01)

(52) U.S. Cl.
CPC .......... *H04W 8/082* (2013.01); *G06F 16/435* (2019.01); *G06F 16/437* (2019.01); *H04L 5/0053* (2013.01)

(58) Field of Classification Search
CPC .................. H04W 8/082; H04L 5/0053; G06F 17/30029; G06F 17/30035
USPC ....................................................... 370/331
See application file for complete search history.

(56) References Cited

U.S. PATENT DOCUMENTS

| | | |
|---|---|---|
| 7,912,477 B2 | 3/2011 | Tamura et al. |
| 8,095,109 B2 | 1/2012 | Rydnell et al. |
| 8,175,575 B2 | 5/2012 | Cai et al. |
| 8,179,903 B2 | 5/2012 | Gupta et al. |
| 8,270,942 B2 | 9/2012 | Zabawskyj et al. |
| 8,295,830 B1 | 10/2012 | Faccin |

(Continued)

FOREIGN PATENT DOCUMENTS

| | | |
|---|---|---|
| JP | 2010535456 A | 11/2010 |
| WO | WO 00/56085 | 9/2000 |

(Continued)

OTHER PUBLICATIONS

Clark, M., et al., "Preparing for LTE Roaming," Syniverse Technologies [online], May 2011 [retrieved from the Internet URL: http://www.syniverse.com/files/LTE-Roaming-BARG-Workshop-bj.pdf.] Located via Google.

(Continued)

*Primary Examiner* — Chuong T Ho
(74) *Attorney, Agent, or Firm* — Hamilton, Brook, Smith & Reynolds, P.C.

(57) ABSTRACT

A system and method enabling VoLTE roaming between at least two mobile LTE networks. According to at least one example embodiment, the system includes a signaling manager, a media resource manager, a serving gateway, a virtual user device for each of one or more user devices. The signaling manager and the media resource manager are configured to accept signaling and a media stream, respectively, from one or more user devices associated with a home mobile network. According to at least one other aspect, each virtual user device is configured to relay the accepted signaling and media stream through a connection established by the serving gateway, to the home network.

38 Claims, 6 Drawing Sheets

(56) References Cited

U.S. PATENT DOCUMENTS

| | | |
|---|---|---|
| 9,154,993 B1 | 10/2015 | Breau |
| 9,198,220 B2 | 11/2015 | Sugimoto et al. |
| 9,392,436 B2 * | 7/2016 | Xu .................. H04W 8/06 |
| 9,479,951 B2 | 10/2016 | Curtin et al. |
| 9,560,517 B2 | 1/2017 | Keller et al. |
| 9,654,964 B1 | 5/2017 | Carames |
| 9,756,522 B2 | 9/2017 | Kotecha et al. |
| 9,788,188 B2 | 10/2017 | Xu et al. |
| 9,924,344 B1 | 3/2018 | Datar |
| 2002/0045424 A1 | 4/2002 | Lee |
| 2002/0191576 A1 | 12/2002 | Inoue et al. |
| 2007/0060097 A1 | 3/2007 | Edge |
| 2007/0232301 A1 | 10/2007 | Kueh |
| 2007/0263608 A1 | 11/2007 | Han |
| 2008/0285492 A1 | 11/2008 | Vesterinen |
| 2009/0047947 A1 | 2/2009 | Giaretta et al. |
| 2009/0073995 A1 | 3/2009 | Pandey et al. |
| 2009/0168694 A1 | 7/2009 | Akselin et al. |
| 2009/0268668 A1 | 10/2009 | Tinnakornsrisuphap et al. |
| 2010/0027533 A1 | 2/2010 | Kant et al. |
| 2010/0097992 A1 | 4/2010 | Velev et al. |
| 2010/0128677 A1 | 5/2010 | Liu et al. |
| 2010/0272063 A1 | 5/2010 | Kato et al. |
| 2010/0144344 A1 | 6/2010 | Jiang |
| 2010/0150057 A1 | 6/2010 | Miklos et al. |
| 2010/0190470 A1 | 7/2010 | Raleigh |
| 2010/0191612 A1 | 7/2010 | Raleigh |
| 2010/0195621 A1 | 8/2010 | Kekki et al. |
| 2010/0197268 A1 | 8/2010 | Raleigh |
| 2010/0208658 A1 | 8/2010 | Vesterinen |
| 2010/0232353 A1 | 9/2010 | Hu et al. |
| 2010/0248713 A1 | 9/2010 | Parker |
| 2011/0026453 A1 | 2/2011 | Yan |
| 2011/0045828 A1 | 2/2011 | Madan et al. |
| 2011/0076985 A1 | 3/2011 | Chami et al. |
| 2011/0103310 A1 | 5/2011 | Stojanovski et al. |
| 2011/0116499 A1 | 5/2011 | Lim et al. |
| 2011/0130117 A1 | 6/2011 | Fan et al. |
| 2011/0158171 A1 | 6/2011 | Centonza et al. |
| 2011/0170517 A1 | 7/2011 | Bakker et al. |
| 2011/0171953 A1 | 7/2011 | Faccin et al. |
| 2011/0173332 A1 | 7/2011 | Li |
| 2011/0176531 A1 | 7/2011 | Rune et al. |
| 2011/0223887 A1 | 9/2011 | Rune et al. |
| 2011/0225632 A1 | 9/2011 | Ropolyi et al. |
| 2011/0235595 A1 | 9/2011 | Mehta et al. |
| 2011/0235605 A1 | 9/2011 | Yeoum et al. |
| 2011/0286384 A1 | 11/2011 | Sugimoto et al. |
| 2011/0292896 A1 | 12/2011 | Yeuom et al. |
| 2012/0003980 A1 | 1/2012 | Lim et al. |
| 2012/0020284 A1 | 1/2012 | Haddad |
| 2012/0039213 A1 | 2/2012 | Cheng et al. |
| 2012/0039323 A1 | 2/2012 | Hirano et al. |
| 2012/0044949 A1 | 2/2012 | Velev et al. |
| 2012/0046058 A1 | 2/2012 | Vesterinen et al. |
| 2012/0057463 A1 | 3/2012 | Hurtta et al. |
| 2012/0082161 A1 | 4/2012 | Leung et al. |
| 2012/0084184 A1 | 4/2012 | Raleigh et al. |
| 2012/0093074 A1 | 4/2012 | Sairanen et al. |
| 2012/0099573 A1 | 4/2012 | Jalkanen |
| 2012/0101952 A1 | 4/2012 | Raleigh et al. |
| 2012/0102174 A1 | 4/2012 | Zhou et al. |
| 2012/0106508 A1 | 5/2012 | Zhou et al. |
| 2012/0110193 A1 | 5/2012 | Zhou et al. |
| 2012/0117251 A1 | 5/2012 | Zhou et al. |
| 2012/0124220 A1 | 5/2012 | Zhou et al. |
| 2012/0269162 A1 | 10/2012 | Vesterinen et al. |
| 2012/0287844 A1 | 11/2012 | Ophir et al. |
| 2013/0171974 A1 | 7/2013 | Bae |
| 2013/0201933 A1 | 8/2013 | Dennert |
| 2014/0036762 A1 * | 2/2014 | Al-Shalash ........... H04W 76/15 370/315 |
| 2014/0086154 A1 * | 3/2014 | Sajadieh ................ H04W 8/18 370/329 |
| 2014/0169286 A1 * | 6/2014 | Xu .................. H04W 8/02 370/329 |
| 2014/0269510 A1 * | 9/2014 | Xu .................. H04W 8/06 370/328 |
| 2015/0050937 A1 | 2/2015 | Rosar |
| 2015/0113044 A1 * | 4/2015 | Noldus ............... H04L 65/1016 709/203 |
| 2015/0131526 A1 * | 5/2015 | Noldus ................. H04L 65/103 370/328 |
| 2015/0215766 A1 | 7/2015 | Russell |
| 2015/0382289 A1 | 12/2015 | Rydnell |
| 2016/0192175 A1 | 6/2016 | Van Veen |
| 2016/0262006 A1 | 9/2016 | Keller |
| 2016/0330655 A1 * | 11/2016 | Vashi ............... H04W 36/0022 |
| 2016/0373973 A1 | 12/2016 | Rommer |
| 2017/0026334 A1 | 1/2017 | Youn |
| 2017/0078942 A1 | 3/2017 | Fan et al. |
| 2017/0142613 A1 | 5/2017 | Singh et al. |
| 2017/0156043 A1 | 6/2017 | Li |
| 2017/0188398 A1 | 6/2017 | Youn |
| 2017/0222932 A1 | 8/2017 | Negm |
| 2018/0063696 A1 | 3/2018 | Xu et al. |

FOREIGN PATENT DOCUMENTS

| | | |
|---|---|---|
| WO | WO 2001/65872 A1 | 9/2001 |
| WO | WO 2007/109955 A1 | 10/2007 |
| WO | WO 2009/024182 A1 | 2/2009 |
| WO | 2009/018533 A | 5/2009 |
| WO | WO 2009/101638 A2 | 8/2009 |
| WO | WO 2011/072438 A1 | 6/2011 |
| WO | WO 2011/080744 A1 | 7/2011 |
| WO | WO 2012/050841 A1 | 4/2012 |
| WO | WO 2012/064980 A1 | 5/2012 |
| WO | WO 2014/093086 A1 | 6/2014 |
| WO | 2017001640 A1 | 1/2017 |
| WO | 2018003954 A1 | 1/2018 |

OTHER PUBLICATIONS

Copeland, R. and Crespi, N., "Resolving Ten MVNO Issues with EPS Architecture, VoLTE and Advanced Policy Server," *Intelligence in Next Generation Networks (ICIN), 2011 15th International Conference on Digital Object Identifier: 10.1109/ICIN.2011. 6081093*, pp. 29-34, IEEE Conference Publications (2011).

Lim, H., et al., "Reducing Communication Overhead for Nested NEMO Networks: Roaming Authentication and Access Control Structure," *IEEE Transactions on Vehicular Technology*, 60(7): 3408-3423 (Sep. 2011).

Motorola, Inc., "Long Term Evolution (LTE): A Technical Overview," Technical White Paper [online], 2007 [retrieved from the Internet: www.motorola.com.], 15 pages.

Nishiyama, H., et al., "A Cooperative User-System Approach for Optimizing Performance in Content Distribution/Delivery Networks," *IEEE Journal on Selected Areas in Communications*, 30(2): 476-483 (Feb. 2012).

Sanyal, R., "Challenges in Interoperability and Roaming between LTE—Legacy core for Mobility Management, Routing, Real Time Charging," *Telecom World (ITU WT), 2011 Technical Symposium at ITU*, pp. 116-122, IEEE Conference Publications (2011).

Notification of Transmittal of The International Search Report and The Written Opinion of the International Searching Authority, or the Declaration in re: International Patent Application No. PCT/US2013/073046, titled: Method And System For Hub Breakout Roaming; dated Feb. 28, 2014.

International Preliminary Report on Patentability in re: International Patent Application No. PCT/US2013/073046, titled: Method And System For Hub Breakout Roaming; dated Jun. 16, 2015.

First Examination Report for New Zealand Application No. 709097, dated Jul. 31, 2017.

GSMA IR.65 IMS Roaming & Interworking Guidelines Version 8.0 (May 9, 2012), pp. 1-26.

"Control and Optimize Your 4G LTE Network with Diameter Signaling Management", F5 Traffix Signaling Delivery Controller Datasheet; F5 Networks, Inc. 2014, pp. 1-11.

(56) References Cited

OTHER PUBLICATIONS

"Stateful GTP Correlation", Gigamon, pp. 1-9, Dec. 2013.
"Feature Brief GTP Correlation", Gigamon, Nov. 2016, pp. 1-4.
"Convene Networks", ConveneGSC, Mar. 3, 2016, http://web.archive.org/web/20160331075107/http://www.convenenetworks.com/solutions/convenegsc/; 2 pages.

* cited by examiner

VOICE OVER IMS ROAMING GATEWAY

RELATED APPLICATION

This application claims the benefit of U.S. Provisional Application No. 62/339,352, filed on May 20, 2016. The entire teachings of the above application are incorporated herein by reference.

BACKGROUND

Wireless communications systems such as the Long Term Evolution (LTE) mobile communications system, also referred to as Evolved Packet System (EPS) or 4th Generation (4G) system, the Global System for Mobile (GSM) communications, or the Wideband Code Division Multiple Access (W-CDMA) mobile communications system, typically enable roaming services. Network operators of such wireless communications systems offer roaming services to their subscribers, therefore allowing the subscribers to stay connected even as they travel across different regions or countries.

The IP Multimedia Subsystem or IP Multimedia Core Network Subsystem (IMS) is an architectural framework for delivering IP multimedia services. Voice over LTE (VoLTE) is a voice service that uses IMS and the LTE IP Core to handle IP based signaling (e.g., Session Initiated Protocol (SIP) and media, Real-Time Protocol (RTP)) enabling a user's user equipment (UE) to make and receive a voice call to or from any other user reachable via mobile, fixed line or IP based telecommunication networks.

SUMMARY

Next generation multimedia services, such as VoLTE, using IMS have long been endorsed by the Global System for Mobile Communications Association (GSMA). However, deployment of such services has been slow due to the challenges posed by the various implementation options and the diverse changing industry needs, specifically the impact on roaming and internetworking scenarios.

Currently, there are two primary models for VoLTE roaming recommended by the GSMA, Local Break-Out (LBO) and S8 Home Routed (S8-HR). However, interoperability issues arise when the visited LTE network and the home LTE network use different VoLTE models, for example if the visited LTE network uses LBO and the home LTE network uses S8-HR and vice versa. A solution allowing roaming user equipment (UE) to utilize VoLTE on a visited LTE network operating under the S8-HR VoLTE model and a home LTE network operating under the LBO-HR model is described in patent application Ser. No. 13/827,996, "Method and System for Hub Breakout Roaming," filed Mar. 14, 2013, and incorporated by reference herein in its entirety. However, there exists a need to develop a roaming solution that allows a visited LTE network using the LBO VoLTE model to operate with a home LTE network using the S8-HR VoLTE model.

Embodiments of the present disclosure are directed to addressing the above-referenced issues by deploying a VoLTE Roaming Gateway that enables a visited LTE network using the LBO VoLTE model to interoperate with a home LTE network using the S8-HR VoLTE model. In addition, the example embodiments described in the present disclosure are configured to comply with local regulations and utilize existing mobile network components.

According to at least one example embodiment, a system includes a signaling manager, a media resource manager, a serving gateway, and a virtual user device for each of one or more user devices associated with roamers' UE from a home mobile network. The signaling manager and the media resource manager are configured to accept signaling and a media stream, respectively, from the one or more user devices associated with the home mobile network via border elements from the visited MNO IMS core (e.g., IBCF and TrGW in visited MNO). According to at least one other aspect, each virtual user device is configured or dynamically created as an instance to relay the accepted signaling and media stream through a connection established by the serving gateway to the home network.

According to at least one other example embodiment, the one or more user devices may be roaming on a visited mobile LTE network configured to use LBO VoLTE roaming and the home network may be configured to use home routing (e.g., S8-HR) VoLTE roaming.

According to at least one other example embodiment, the signaling and the media stream originating from the one or more user devices is transmitted over an IP multimedia services network. According to other embodiments, any of the signaling manager, the media resource manager, the serving gateway, and each virtual user device may be located on a visited mobile LTE network. According to other example embodiments, any of the signaling manager, the media resource manager, the serving gateway, and each virtual user device may be located on an interconnect network in between a visited LTE network and a home LTE network.

According to at least one other example embodiment, the system includes a profile manager that may be configured to acquire user profile data of the one or more user devices, and store the user profile data in a user profile database. The profile manager may acquire the user profile data from an S6a Diameter Signaling feed, a GTP-C feed, or a home subscriber server.

According to at least one other example embodiment, the serving gateway may query a DNS server and select a gateway at the home network based on the DNS server query.

According to at least one example embodiment, a home network may provide VoLTE roaming service by establishing a connection between a gateway at the home network and a VoLTE roaming gateway. The VoLTE roaming gateway may be configured to accept signaling and a media stream originating from one or more user devices associated with the home network that are roaming on a visited network. According to another aspect of the example embodiment, the home network may provide VoLTE roaming service through the connection to a virtual user device in the VoLTE roaming gateway, the virtual user device representing one of the one or more user devices roaming at the visited network. The virtual user device may be configured to relay the signaling and the media stream originating from one or more user devices roaming at the visited network to the home network.

According to another aspect of the example embodiment, the home network may send user profile data of the one or more user devices from the home network to the VoLTE roaming gateway. According to at least one example embodiment, a visited network may provide VoLTE roaming service by establishing a connection between a visited network and a VoLTE roaming gateway. The VoLTE roaming gateway may be configured to accept signaling and a media stream originating from one or more user devices associated with a home network that are roaming on the visited network. According to another aspect of the example embodiment, the visited network may provide VoLTE roaming service to one of the one or more user devices that are roaming on the visited network by relaying the signaling and the media stream from the one user device through the connection to a virtual user device in the VoLTE roaming gateway. The virtual user device may represent the one user device and may be configured to relay the signaling and the media stream to the home network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
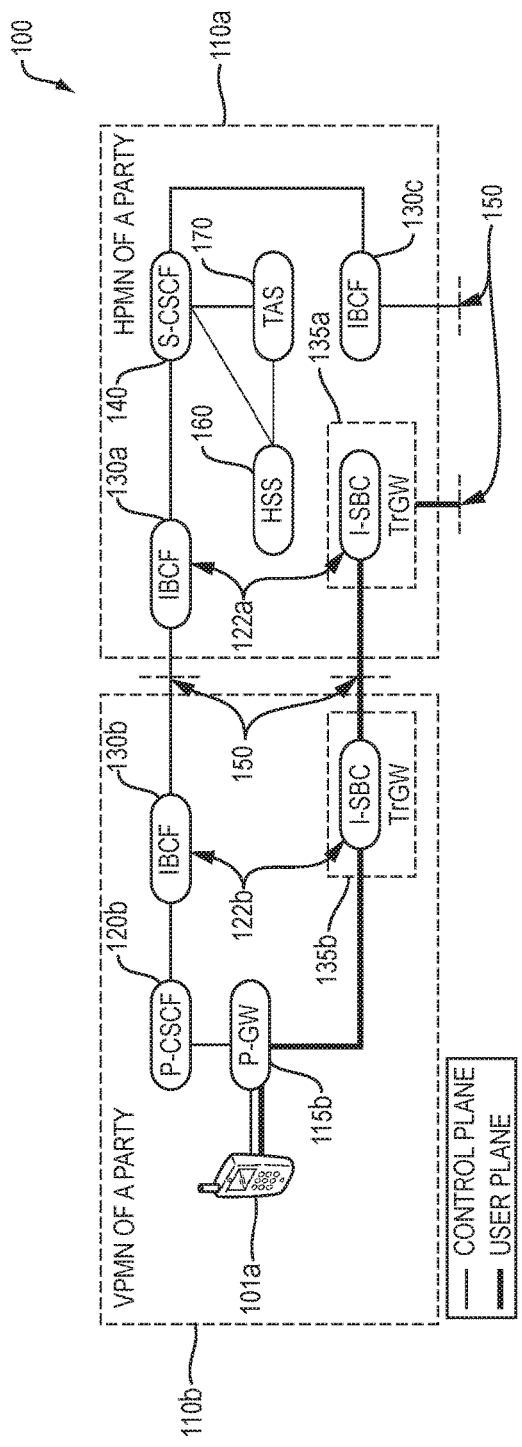
FIG. 1 is a block diagram illustrating a typical reference architecture for a Local Break-Out-Home Routed (LBO-HR) VoLTE roaming model.

FIG. 1 is a block diagram illustrating a typical reference architecture for a Local Break-Out-Home Routed (LBO-HR) VoLTE roaming model 100. According to the model as shown in FIG. 1, a UE 101a, which is associated with the home LTE network 110a, acquires access to the visited LTE network 110b. According to the LBO VoLTE model, after a roaming UE 101a attaches to the visited LTE network 110b, the VoLTE client or user agent (UA) in the UE initiates a SIP signaling session with the Proxy-Call Session Control Function (P-CSCF) 120b (i.e., the control plane) for the VoLTE UE 101a. The P-CSCF 120b acts as a SIP proxy by relaying SIP messages between the VoLTE UE 101a and the visited IMS Core Network 122b. The P-CSCF 120b of the visited LTE Network 110b communicates with the Serving-Call Session Control Function (S-CSCF) 140 of the home LTE network 110a through the Interconnection Border Control Function (IBCF) 130b and 130a. Each IBCF acts as a gateway (or border) node between the networks by interfacing with each other via the IMS network-to-network interface (IMS-NNI) 150.

The SIP signaling from P-CSCF 120b passes through the IMS-NNI to the home IMS Core Network's 122a IBCF 130a. The IBCF 130a bridges the SIP signaling to the S-CSCF 140. The S-CSCF 140 provides session set-up, session tear-down, session control and routing functions and interfaces with the Home Subscriber Server (HSS) 160 to load all the necessary subscriber profile information for UE 101a's authentication. The Terminated Application Server (TAS) 170 interfaces with the S-CSCF 140 and the HSS 160 to provide additional supplementary service functionality. The S-CSCF 140 also interfaces with IBCF 130c to bridge the SIP signaling to a potential destination network to eventually terminate a VoLTE call.

In parallel with handling the session signaling (i.e., the control plane) for the UE 101a, the visited LTE network 110b provides a Real Time Protocol (RTP) connection to UE 101a through the visited LTE network P-GW 115b. The visited LTE network P-GW 115b provides an entry and exit point for user plane (i.e., media plane) traffic and assigns a local (in relation to the visited LTE network 110b) IP address to the UE 101a. The UE 101a is now able to communicate the media (i.e., data), over the RTP connection required to place a VoLTE call through the transition gateway (TrGW) 135b of the visited LTE network 110b to the TrGW 135a of the home LTE network. According to some embodiments, the TrGWs 135b and 135a may be implemented in an Interconnect Session Border Controller (I-SBC).

The visited TrGW 135b and the home TrGW 135a are IP to IP gateways and serve as border elements (in conjunction with IBCFs) in the media plane, enabling the home IMS network 122a and visited IMS network 122b to interface. The visited to home network IBCF/TrGW interface enables the UE 101a to access the home IMS 122a services, such as registration, making and receiving a call, etc. In the event a VoLTE call is placed to a destination network (i.e., a network other than the home LTE Network and the visited LTE network), the TrGW 135a will establish an RTP connection with the TrGW of the destination network, in parallel with the IBCF 130c interfacing the SIP signaling with the IBCF of the destination network.

The LBO VoLTE roaming model has several advantages over the S8-HR VoLTE roaming model. LBO allows for optimized call routing. LBO also provides better support of emergency calls in visited networks, as well as easier lawful interception of calls, which is why some countries require visited VoLTE networks to utilize LBO VoLTE roaming. LBO-HR also allows the visited network to create call detail records (CDR) to track voice usage, thus enabling service-based revenue sharing between the home and visited networks. However, the LBO model also has several disadvantages, including interoperability issues between home and visited networks which may require extensive and expensive testing to overcome. Therefore, some mobile network operators prefer S8-HR VoLTE roaming because it is easier to implement on existing infrastructure.

Figure 2:
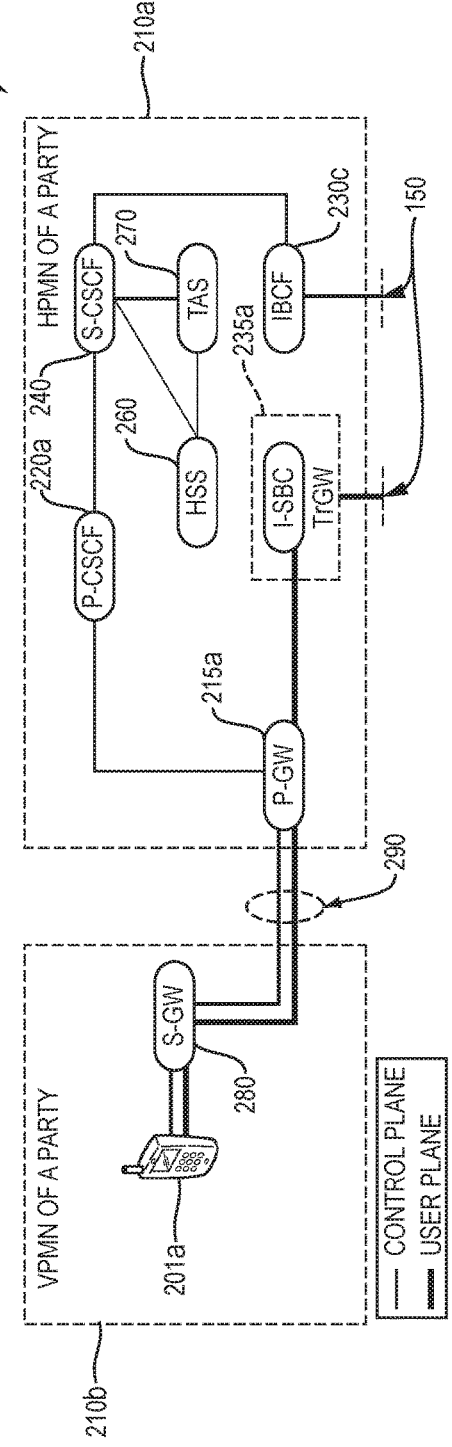
FIG. 2 is a block diagram illustrating a typical reference architecture for a S8 Home Routed (S8-HR) VoLTE roaming model.

FIG. 2 is a block diagram illustrating a typical reference architecture for a S8 Home Routed (S8-HR) VoLTE roaming model 200. According to the model in FIG. 2, a UE 201a, which is associated with the home LTE network 210a, acquires access to the visited LTE network 210b. The serving gateway (S-GW) 280 accepts and forwards user data packets to and from the UE 201a. The S-GW 280 of the visited LTE network communicates directly with the P-GW 215a of the home LTE network through an S8 LTE Data roaming interface 290 (i.e., S8 GTP Tunnel). The home LTE network P-GW 215a provides an entry and exit point for session signaling and RTP traffic into the home LTE network 210a. The P-GW 215a also assigns a local IP address (in relation to the home LTE network 210a) to the UE 201a. This results in the UE 201a acquiring data roaming access through the S8 interface 290 between the visited S-GW 280 and the home P-GW 215a to utilize the VoLTE/IMS services directly from the home network 210a.

The P-GW 215a passes the session signaling (i.e., control plane signaling) to the P-CSCF 220a, which relays the session signaling for the UE 201a utilizing VoLTE services. The S-CSCF 240 provides session set-up, session tear-down, session control and routing functions and interfaces with the HSS 260 to load all the necessary subscriber profile information for UE 201a. The TAS 270 interfaces with the S-CSCF 240 and the HSS 260 to provide additional supplementary service functionality. The S-CSCF 240 also interfaces with IBCF 230c to bridge the session signaling (e.g., SIP signaling) to a potential destination network to complete a VoLTE call.

The home LTE network P-GW 215a also provides an entry and exit point for RTP (i.e., user plane traffic). The UE 201a is now able to place a VoLTE call with another UE (not shown in FIG. 2) located in the same home LTE network 210a or a UE (not shown in FIG. 2) in another network through the transition gateway (TrGW) 235a of the home LTE network 210a to the TrGW of a destination network, in parallel with the IBCF 230c interfacing the control plane signaling with the IBCF of the destination network.

By utilizing the S8-HR VoLTE roaming model, the visited network 210b does not provide any local IMS services, and does not need to establish an IMS-NNI between the visited and home network, thus avoiding the interoperability issues and testing required to establish such an interface. The home and visited network are able to use the existing S8 LTE roaming interface and the visited network does not need any interconnect border control (IBC) components (e.g., ICBF and TrGW). However, the S8-HR VoLTE roaming model has issues with handling local (in relation to the visited network) emergency calling and lawful interception, which may conflict with the visited country's regulations. Further, the visited network cannot create CDRs, because the visited network only observes data being transferred over the S8 LTE interface, as opposed to a VoLTE call. This can lead to billing issues as the visited network is tracking data usage and the home network is tracking CDRs for the VoLTE calls. Additionally, there is no optimized call routing, for example, when the UE 201a calls a destination number local to the visited network, the call will still be routed to the home network 210a and then back to the visited network 210b.

As both LBO and S8-HR VoLTE roaming models each have advantages and disadvantages, mobile network operators have not established a worldwide consensus on a preferred VoLTE roaming model. The lack of interoperability between a visited mobile network using LBO VoLTE and a home mobile network configured to use the S8-HR VoLTE roaming model has limited the availability of VoLTE roaming services and delayed the development of VoLTE for the mobile industry as a whole.

Figure 3:
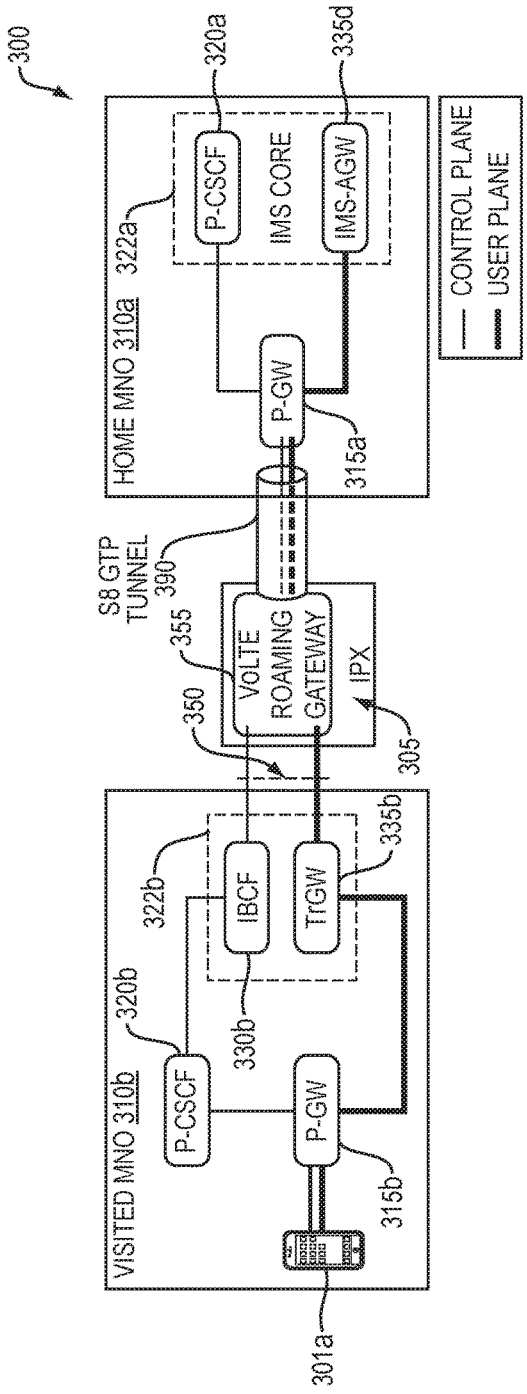
FIG. 3 is a block diagram illustrating a visited network using a LBO VoLTE roaming model interfacing through a VoLTE Roaming Gateway located in a transit network with a home mobile network configured for S8-HR VoLTE roaming, according to at least one example embodiment.

Embodiments of the present invention offer a method and system enabling a visited mobile network using LBO to interface with a home mobile network using only S8-HR for VoLTE roaming. The example embodiment in FIG. 3 illustrates a visited network 310b using a LBO VoLTE roaming model interfacing, through a VoLTE Roaming Gateway 355, with a home mobile network 310a configured for S8-HR VoLTE roaming. According to some embodiments, the visited mobile network 310b and its components (P-GW 315b, P-CSCF 320b, IBCF 330b, and TrGW 335b) may operate similarly to the visited mobile network 110b illustrated and described in FIG. 1. The UE 301a is able to connect to the visited network 310b and utilize the local (in relation to the visited network) IMS network 322b. The visited mobile network 310b interfaces with a VoLTE Roaming Gateway 355 through the IMS-NNI 350. The VoLTE Roaming Gateway 355 is configured to receive IMS signaling (e.g., control plane signaling, VoLTE session signaling, etc.) and data (e.g., user plane, media plane, RTP, etc.) from the IMS-NNI 350 and transform that signaling and data for transmission over an S8 GTP tunnel 390 in a form acceptable to the home mobile network 310a (See FIG. 5 and the accompanying description for the details of the transformation).

The home mobile network 310a and its components (P-GW 315a, P-CSCF 320a, and IP Media Service Access Gateway (IMS-AGW) 335d) may operate similarly to the home mobile network 210a illustrated and described in FIG. 2. The home mobile network 310a receives bidirectional signaling from the VoLTE Roaming Gateway (VRG) 355 through the S8 GTP Tunnel 390 as if the UE 301a were operating on a visited network similar to the visited network 210b of FIG. 2. The home LTE network P-GW 315a provides an entry and exit point for user plane and control plane traffic from the VRG 355 into the home LTE network 310a. This results in the UE 301a acquiring VoLTE roaming access through the IMS-NNI 350, the VRG 355, the S8 GTP Tunnel 390, and the home P-GW 315a to utilize the VoLTE/IMS services 322a on the home network 310a. In this example embodiment, neither the home mobile network 310a nor the visited mobile network 310b needed to adopt a different roaming model in order to interoperate with each other and provide VoLTE roaming service to UE 301a. The example architecture in FIG. 3 illustrates the VRG 355 located on an interconnect network (e.g., an Internetwork Packet eXchange (IPX)) 305. One of ordinary skill in the art would recognize that the VRG 355 could be located anywhere in between the visited and home mobile networks, including inside either mobile network.

Figure 4:
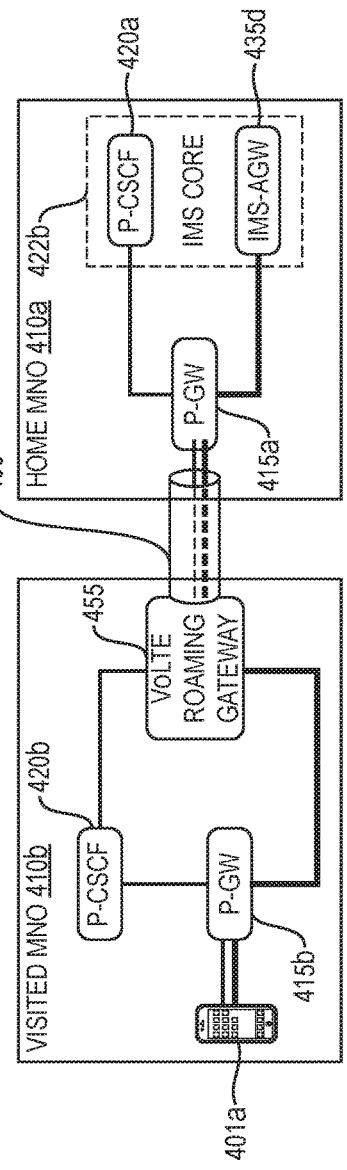
FIG. 4 is a block diagram illustrating an embodiment where the VoLTE Roaming Gateway is located in the visited LTE network, according to at least one example embodiment.

FIG. 4 illustrates an alternative embodiment where the VRG 455 is part of the visited LTE network 410b. According to this embodiment, the visited LTE network, which is configured for LBO VoLTE roaming, would no longer require the IBCF and TrGW, because the P-GW 415b and the P-CSCF 420b are able to interface directly with the VRG 455. Thus, no network to network interface or session border control devices between the VRG 455 and the visited LTE network's 410b components are necessary. The VRG 455 receives the control plane signaling and the user plane data directly and can then transform it for transmission over an S8 GTP tunnel 490 in a form acceptable to the home mobile network 310a, which is configured for S8-HR VoLTE roaming.

Figure 5:
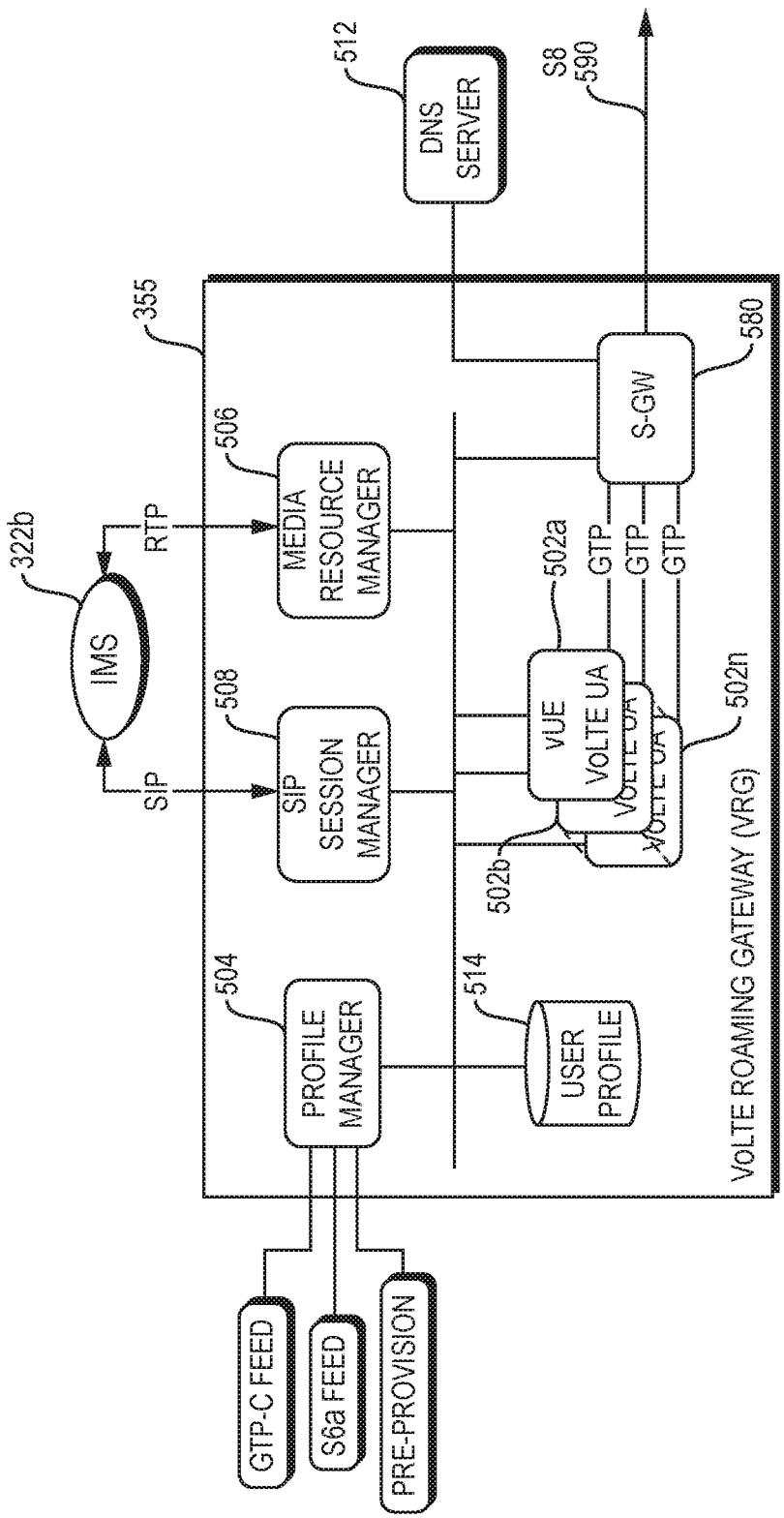
FIG. 5 is a block diagram illustrating the internal architecture of the VoLTE Roaming Gateway, according to at least one example embodiment.

FIG. 5 illustrates the internal architecture of the VoLTE Roaming Gateway, according to at least one example embodiment. The SIP Session Manager 508 receives SIP signaling from the IMS Core 322b and initiates virtual user equipment (vUE) 502a. The Media Resource Manager 506 allocates RTP resources (e.g., UDP port numbers for the visited mobile network to connect to, a UDP port number to be used for the vUE 502*a*, and software structure to relay the RTP media between those two ports and vice versa) upon receiving an instruction from SIP Session Manager 508 to receive a RTP/RTCP media stream (i.e., user plane data, media plane data, etc.) from the IMS Core 322*b* and relays the RTP/RTCP media stream to the newly created vUE 502*a*. Alternatively, if the VRG 355 is part of the visited network as in FIG. 4, then the SIP Session Manager 508 and the Media Resource Manager 506 would receive the signaling and the media stream directly from the P-CSCF 420*b* and P-GW 415*b*, respectively.

According to some embodiments, the vUE 502*a* is a virtual representation of the UE 301*a* connected to the visited LTE network 310*b*. The VRG 355 is capable of establishing a plurality of vUEs 502*a*-502*n*, each representing different user equipment connected to one or more visited networks. The VRG 355 may decompose the SIP signaling and media stream and recreate the signaling and media for the vUE 502*a* in the same form it originally was received from the UE 301*a*. In other words, it is as if the UE 301*a* is connected to the S-GW 580 through its virtual representation in a way similar to the UE 201*a* in FIG. 2.

The Profile Manager 504 may acquire user profile data from a variety of sources, and stores the profile data in the local user profile database 514. The user profile data may be pre-provisioned and/or extracted from the user profiles stored on the home HSS. The Profile Manager 504 may also extract, in real-time, user profile information from the Sha signaling (e.g., DRA, DEA, and MME), the GTP-C flow data when the UE 301*a* is attaching to the visited network's P-GW 315*b*, and/or the call detail record (CDR). With the collected and stored user information, the User Profile database 514 may mimic the home network's HSS. The VRG 355 utilizes the user profile dataset to maintain at least the minimum data set for each user profile required to create a PDP Data Session over the S8 tunnel 590.

The vUE 502*a* receives the SIP signaling, RTP media stream, and user profile data from the SIP Session Manager 508, Media Resource Manager 506, and User Profile database 514 respectively. Utilizing the signaling, media, and user information, the vUE 502*a* is then able to initiate an S8 data session via the S-GW 580. The S-GW 580 initiates a PDP session with the home P-GW 315*a* per the request from the vUE 502*a*. According to some embodiments, the S-GW 80 queries the DNS server 512 to select the proper P-GW. By establishing the vUE 502*a*, the VRG emulates the UE 301*a* in a manner that the home LTE network 310*a* is able to communicate with the vUE 501*a* as if it was the UE 301*a* operating in a visited LTE network using the S8-HR VoLTE roaming model shown in FIG. 2.

Figure 6:
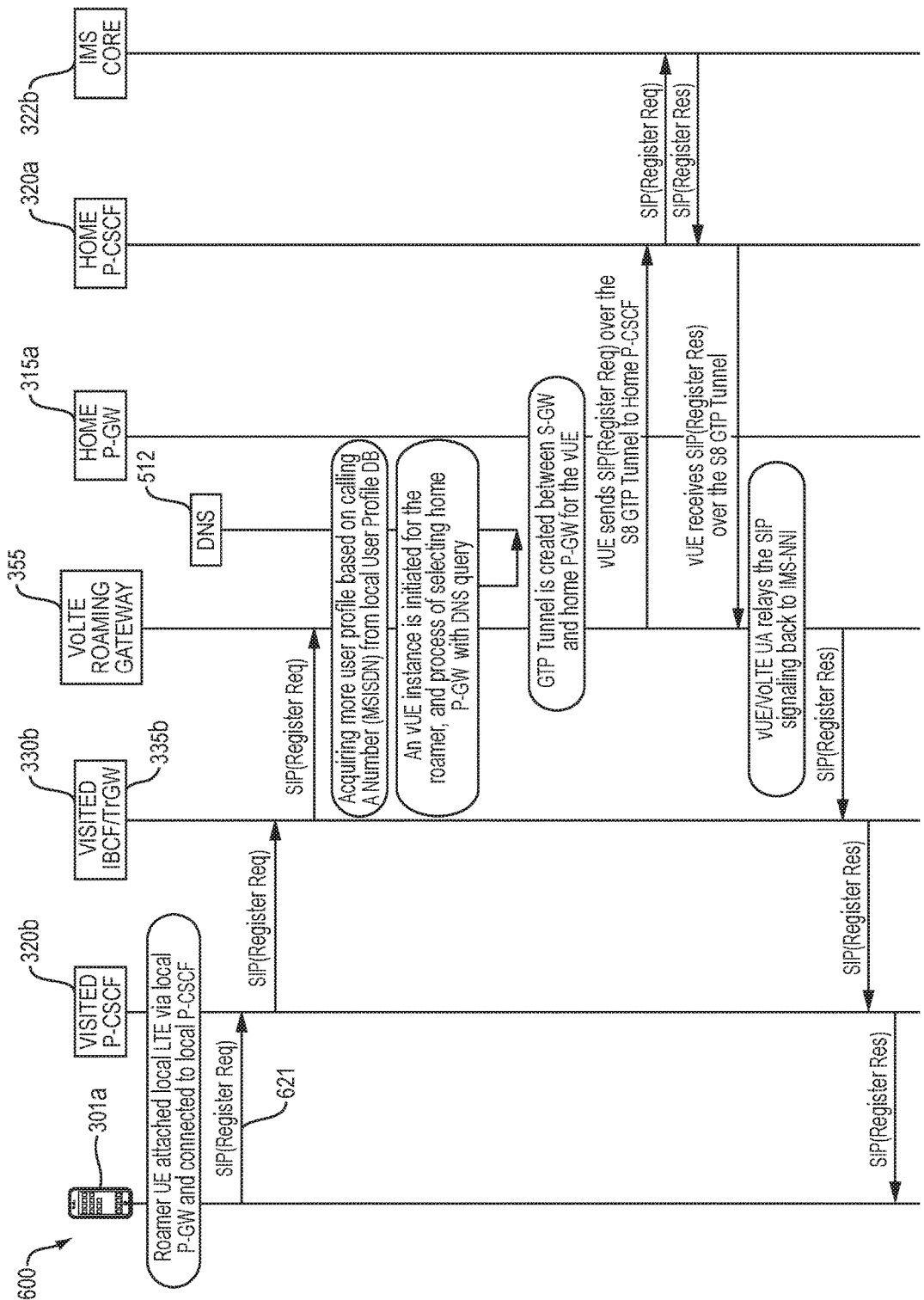
FIG. 6 is a signaling flow diagram illustrating signals exchanged between different entities with respect to a roaming VoLTE User registration process, according to at least one example embodiment.

FIG. 6 is a signaling flow diagram illustrating signals exchanged between different entities with respect to a roaming VoLTE SIP registration process 600, according to at least one example embodiment. According to at least one aspect, a UE 301*a*, associated with the home LTE network 310*a*, is roaming to the visited LTE network 310*b*. The roaming UE 301*a* initiates a VoLTE SIP Registration request 621 through the P-CSCF 320*b* of the visited LTE network 310*b*, and the registration request 621 is sent from the IBCF 330*b* of the visited network to the VoLTE Roaming Gateway 355.

The VRG 355 receives the SIP registration request 621 and acquires UE 301*a*'s user profile, based on the calling A Number (i.e., MSISDN) from the User Profile database 514. The VRG 355 initiates a vUE 502*a* to virtually represent the UE 301*a*, and selects a home P-GW with a DNS query from the DNS server 512. The VRG 355 also initiates a S8 GTP Tunnel 390 between the S-GW 580 and the selected home P-GW 315*a* for the vUE 502*a*. The vUE 502*a* sends the SIP registration request 621 over the S8 GTP Tunnel 390 to the home P-CSCF 320*a*. The P-CSCF 320*a* interfaces with the IMS Core 322*a*, sends the SIP registration request 621 and receives the SIP registration response 622. The P-CSCF 320*a* sends the SIP registration response 622 to the vUE 502*a* over the S8 GTP Tunnel 390. The VRG 355 relays the SIP registration response 622 back to the UE 301*a*.

Figure 7:
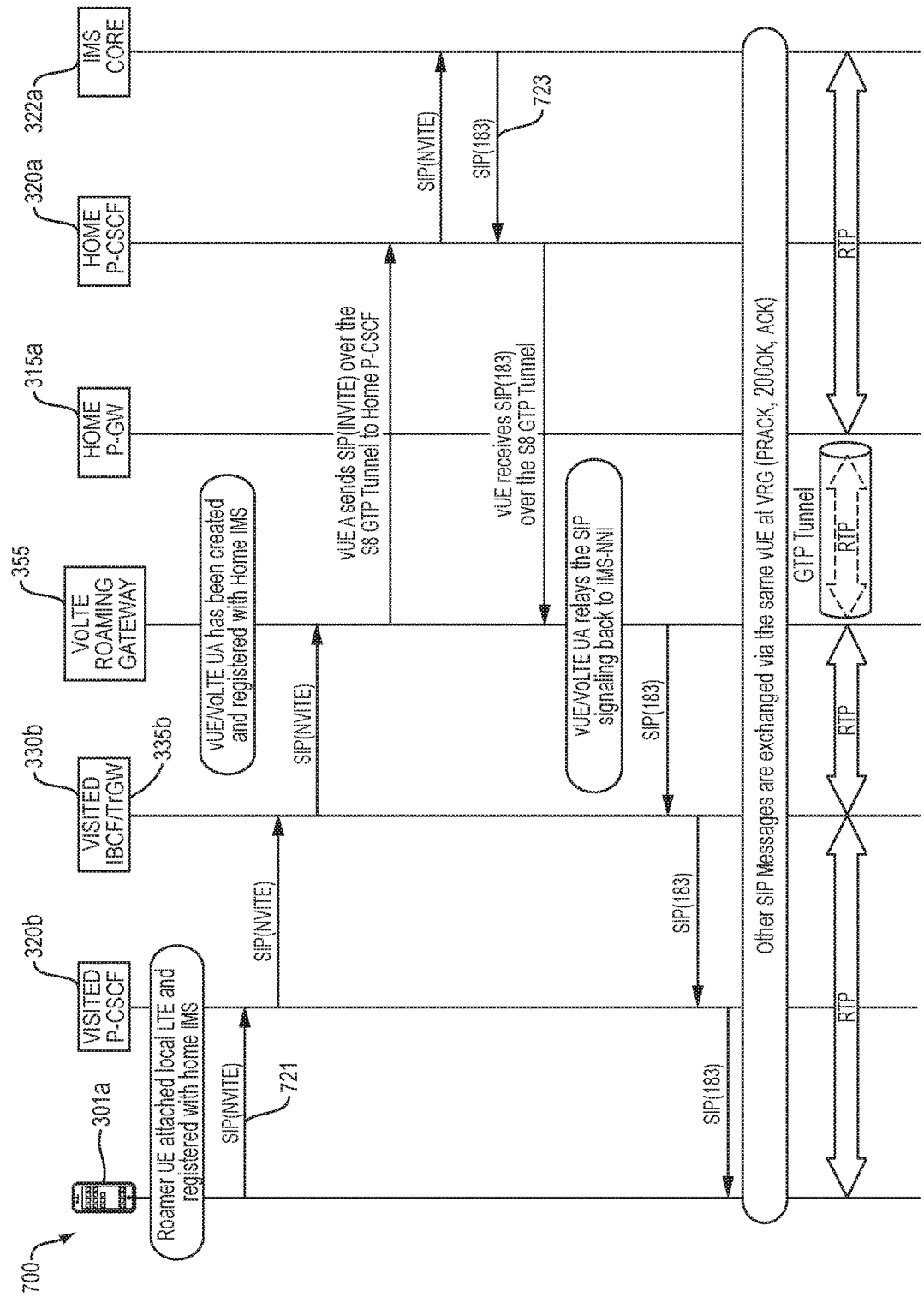
FIG. 7 is a signaling flow diagram illustrating a SIP INVITE establishing a media session between the UE and the home IMS Core Network, according to at least one example embodiment.

FIG. 7 is a signaling flow diagram illustrating a SIP INVITE establishing a media session between the UE 301*a* and the home IMS Core network 322*a*, according to at least one example embodiment. According to at least one aspect, a UE 301*a*, attached to the visited LTE network 310*b* and registered with the home IMS Core 322*a*, may initiate a VoLTE call by sending a SIP INVITE 721 from the visited LTE network 310*b* and through the VRG 355 to the home LTE network 310*a*. The VRG 355 receives the SIP INVITE 721 and uses the created vUE 502*a*, which is registered with the home IMS Core 322*a*, to send the SIP INVITE 721 over the S8 GTP Tunnel to the home P-CSCF 320*a* and then on to the home IMS Core 322*a*. A SIP (183) message is sent back through the same route, being relayed through the vUE 502*a* in the VRG 355, to the UE 301*a*. Other SIP messages (e.g., PRACK, 2000K, ACK, etc.) may also be exchanged between the visited LTE network 310*b* and the home LTE network 310*a* utilizing the same or a similar process. Once the media session between the UE 301*a* and the home IMS Core is established, a media stream (e.g., audio and/or video) may be communicated using Real-time Transport Protocol (RTP).

Figure 8:
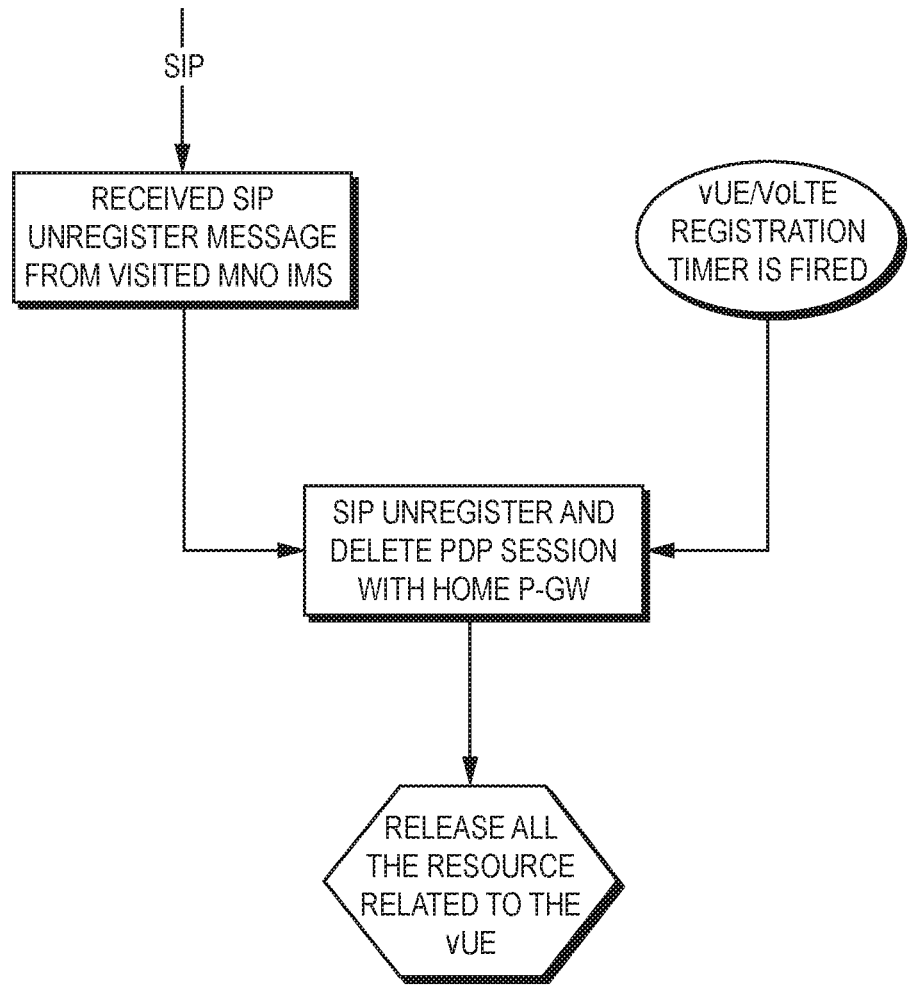
FIG. 8 is a flow diagram illustrating the VoLTE Roaming Gateway's release of resources upon receiving a SIP unregister message, according to at least one example embodiment.

FIG. 8 is a flow diagram illustrating the VoLTE Roaming Gateway's release of resources upon receiving a SIP unregister message, according to at least one example embodiment. According to some embodiments, the VRG 355 receives a SIP Unregister Message from the visited LTE network's IMS Core 322*b*, or the vUE 501*a*'s registration timer within the VRG 355 is fired. The VRG 355 deletes the PDP session with the selected home P-GW 315*a* and releases all the resources related to the vUE 501*a*. This process ensures that the vUE is unregistered when the corresponding UE is unregistered.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

One of ordinary skill in the art would recognize that the above described embodiments could be implemented in $5^{th}$ generation (5G) mobile networks or $5^{th}$ generation wireless systems. 5G is currently not implemented, but 5G will be implemented using the Evolved Packet System (EPS) including Evolved Packet Core (EPC) network and Diameter signaling which is currently used by the Long Term Evolution (LTE or 4G) networks. Thus, where the term LTE is used in this application it should be considered inclusive of 5G or any other applicable standard of wireless data communication.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
    a signaling manager configured to accept signaling originating from a plurality of user devices associated with a home network and roaming on a visited network;
    a media resource manager configured to accept media streams originating from the plurality of user devices;
    a serving gateway configured to establish a connection with the home network; and
    for the plurality of user devices, a plurality of virtual user devices representing the plurality of user devices, the plurality of virtual user devices configured to relay the accepted signaling and the accepted media stream to the home network.

2. The system of claim 1, wherein the visited network is a visited mobile LTE network configured to use local breakout voice over LTE (VoLTE) roaming.

3. The system of claim 2, wherein the home network is a home mobile LTE network configured to use home routed VoLTE roaming.

4. The system of claim 1, wherein the signaling and the media streams originating from the plurality of user devices is transmitted over an IP multimedia services network.

5. The system of claim 1, wherein any of the signaling manager, media resource manager, the serving gateway, and each virtual user device is located on the visited network.

6. The system of claim 1, wherein any of the signaling manager, media resource manager, the serving gateway, and each virtual user device is located on the home network.

7. The system of claim 1, wherein any of the signaling manager, media resource manager, the serving gateway, and each virtual user device is located on a transit network.

8. The system of claim 1, further comprising:
    a profile manager configured to acquire user profile data of the plurality of user devices, and store the user profile data in a user profile database.

9. The system of claim 8, wherein the profile manager acquires the user profile data from any combination of an S6a Diameter Signaling feed, a GTP-C feed, or a home subscriber server.

10. The system of claim 1, wherein the serving gateway is further configured to query a DNS server and select a gateway at the home network based on the DNS server query.

11. The system of claim 10, wherein the serving gateway is further configured to communicate with the selected gateway at the home network over a GTP tunnel.

12. A method comprising:
    accepting, at a roaming gateway, signaling originating from a plurality of user devices associated with a home network and roaming on a visited network;
    accepting, at the roaming gateway, a media stream originating from the plurality of user devices;
    establishing a connection between the roaming gateway and a gateway at the home network; and
    for the plurality of user devices, generating a plurality of virtual user devices at the roaming gateway representing the plurality of user devices, the plurality of virtual user devices configured to relay the accepted signaling and the accepted media streams to the gateway at the home network.

13. The method of claim 12, wherein the visited network is a visited mobile LTE network configured to use local breakout VoLTE roaming.

14. The method of claim 13, wherein the home network is a home mobile LTE network configured to use home routed VoLTE roaming.

15. The method of claim 12, wherein the signaling and the media streams originating from the plurality of user devices is transmitted over an IP multimedia services network.

16. The method of claim 12, wherein the roaming gateway is located on the visited network.

17. The method of claim 12, wherein the roaming gateway is located on the home network.

18. The method of claim 12, wherein the roaming gateway is located on a transit network.

19. The method of claim 12, further comprising:
acquiring user profile data of the plurality of user devices; and
storing the user profile data in a user profile database.

20. The system of claim 19, wherein acquiring the user profile data includes acquiring the user profile data from any combination of an S6a Diameter Signaling feed, a GTP-C feed, or a home subscriber server.

21. The method of claim 12, further comprising:
querying a DNS server; and
selecting the gateway at the home network based on the DNS server query.

22. The system of claim 21, wherein the roaming gateway is further configured to communicate with the selected gateway at the home network over a GTP tunnel.

23. A method comprising:
establishing a connection between a gateway at a home network and a roaming gateway, the roaming gateway configured to accept signaling and media streams originating from a plurality of user devices associated with the home network that are roaming on a visited network; and
providing roaming service through the connection to a plurality of virtual user devices in the roaming gateway, the plurality of virtual user devices representing the plurality of user devices and configured to relay the signaling and the media streams originating from plurality of user devices to the home network.

24. The method of claim 23 further comprising sending user profile data of the one or more user devices from the home network to the roaming gateway.

25. The method of claim 23, wherein the visited network is a visited mobile LTE network configured to use local breakout VoLTE roaming.

26. The method of claim 25, wherein the home network is a home mobile LTE network configured to use home routed VoLTE roaming.

27. A system comprising:
a gateway at a home network configured to:
establish a connection with a roaming gateway, the roaming gateway configured to accept signaling and media streams originating from a plurality of user devices associated with the home network that are roaming on a visited network, and
provide roaming service through the connection to a plurality of virtual user devices in the roaming gateway, the plurality of virtual user devices representing the plurality of user devices and configured to relay the signaling and the media streams originating from plurality of user devices to the home network.

28. The system of claim 27 further comprising a user profile database configured to communicate user profile data of the plurality of user devices from the home network to the roaming gateway.

29. The system of claim 27, wherein the visited network is a visited mobile LTE network configured to use local breakout VoLTE roaming.

30. The system of claim 29, wherein the home network is a home mobile LTE network configured to use home routed VoLTE roaming.

31. A method comprising:
establishing a connection between a visited network and a roaming gateway, the roaming gateway configured to accept signaling and media streams originating from a plurality of user devices associated with a home network that are roaming on the visited network; and
providing roaming service to the plurality of user devices that are roaming on the visited network by relaying the signaling and the media streams from the plurality of user devices through the connection to a plurality of virtual user devices in the roaming gateway, the plurality of virtual user devices representing the plurality of user devices and configured to relay the signaling and the media streams to the home network.

32. The method of claim 31, wherein the visited network is a visited mobile LTE network configured to use local breakout VoLTE roaming.

33. The method of claim 32, wherein the home network is a home mobile LTE network configured to use home routed VoLTE roaming.

34. The method of claim 31, further comprising sending user profile data of the plurality of user devices from the home network to the roaming gateway.

35. A system comprising:
an interconnection border control function (IBCF) in a visited network configured to communicate signaling between a plurality of user devices associated with a home network that are roaming on the visited network and a roaming gateway;
a transition gateway (TrGW) in the visited network configured to communicate media streams between the plurality of user devices and the roaming gateway;
a gateway in the visited network configured to provide roaming service to the plurality of user devices that are roaming on the visited network by relaying the signaling from the plurality of user devices through the IBCF and the media streams from the plurality of user devices through the TrGW to a plurality of virtual user devices in the roaming gateway, the plurality of virtual user devices representing the plurality of user devices and configured to relay the signaling and the media streams to the home network.

36. The system of claim 35, wherein the visited network is a visited mobile LTE network configured to use local breakout VoLTE roaming.

37. The system of claim 36, wherein the home network is a home mobile LTE network configured to use home routed VoLTE roaming.

38. The system of claim 35 further comprising a Proxy-Call Session Control Function (P-CSCF) in the visited network configured to send user profile data of the one or more user devices from the visited network to the roaming gateway.

* * * * *